(12) United States Patent
Davis et al.

(10) Patent No.: US 12,309,118 B2
(45) Date of Patent: May 20, 2025

(54) MANAGING TRAFFIC RULES IN ASSOCIATION WITH FULLY QUALIFIED DOMAIN NAMES (FQDNs)

(71) Applicant: HYAS Infosec Inc., Victoria (CA)

(72) Inventors: Christopher Davis, Nanaimo (CA); Paul van Gool, Santa Barbara, CA (US)

(73) Assignee: HYAS Infosec Inc., Vancouver (CA)

( * ) Notice: Subject to any disclaimer, the term of this patent is extended or adjusted under 35 U.S.C. 154(b) by 150 days.

(21) Appl. No.: 17/841,478

(22) Filed: Jun. 15, 2022

(65) Prior Publication Data

US 2022/0407842 A1 Dec. 22, 2022

Related U.S. Application Data

(60) Provisional application No. 63/211,448, filed on Jun. 16, 2021.

(51) Int. Cl.
*H04L 9/40* (2022.01)

(52) U.S. Cl.
CPC ................... *H04L 63/0263* (2013.01)

(58) Field of Classification Search
CPC .................................................. H04L 63/0263
See application file for complete search history.

(56) References Cited

U.S. PATENT DOCUMENTS

| | | | |
|---|---|---|---|
| 2006/0212930 A1* | 9/2006 | Shull | G06F 21/577 726/10 |
| 2021/0226918 A1* | 7/2021 | Ossipov | H04L 63/0236 |
| 2022/0255922 A1* | 8/2022 | Zacks | H04L 63/0853 |
| 2022/0400128 A1* | 12/2022 | Kfir | G06N 3/126 |

* cited by examiner

*Primary Examiner* — Viet D Vu

(57) ABSTRACT

Systems, methods, and software described herein manage traffic rules in association with fully qualified domain names (FQDNs). In one implementation, a domain name system (DNS) security service obtains notifications associated with an FQDN included in DNS requests. In response to the notifications, the DNS security service generates scores for the FQDN based on trust factors associated with the FQDN and determines traffic rules based on the scores.

18 Claims, 7 Drawing Sheets

MANAGING TRAFFIC RULES IN ASSOCIATION WITH FULLY QUALIFIED DOMAIN NAMES (FQDNs)

RELATED APPLICATIONS

This application hereby claims the benefit of and priority to U.S. Provisional Patent Application No. 63/211,448, titled "MANAGING TRAFFIC RULES IN ASSOCIATION WITH FULLY QUALIFIED DOMAIN NAMES (FQDNS)," filed Jun. 16, 2021, and which is hereby incorporated by reference in its entirety.

BACKGROUND

In computing environments, firewall services may be used to monitor incoming and outgoing network traffic to permit or block data packets based on security rules. In some examples, some firewall services may provide a Domain Name Server (DNS) resolver that is used to receive DNS requests from computing systems on a local network and provide the requesting computing system with a corresponding internet protocol (IP) address.

In some examples, DNS requests from computing systems may include fully qualified domain names (FQDNs). A FQDN specifies the exact location in the tree hierarchy of the DNS. It specifies all domain levels, including the top-level domain and the root zone. In some examples, the FQDN can have a host name and at least one higher-level domain (label) and always ends in the top-level domain. When a request is received from a computing device, a resolver may identify an IP address for the connection and provide the IP address to the requesting device. However, difficulties can arise in determining whether the connection with the IP address for the FQDN is malicious and whether a connection should be permitted with the destination associated with the FQDN.

OVERVIEW

Provided herein are systems, methods, and software to manage traffic rules in association with fully qualified domain names (FQDNs). In one implementation, a domain name system (DNS) security service obtains a FQDN associated with a DNS request by a computing device. In response to obtaining the FQDN, the DNS security service generates a first score for the FQDN based on trust factors associated with the FQDN and a traffic rule from a plurality of traffic rules for the DNS request based on the first score.

The DNS security service may further obtain one or more notifications of one or more additional DNS requests for the FQDN and update the first score to a second score based on the trust factors associated with the FQDN. Based on the second score, the DNS security service may determine a second traffic rule from the plurality of traffic rules for a most recent DNS request of the one or more additional DNS requests.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
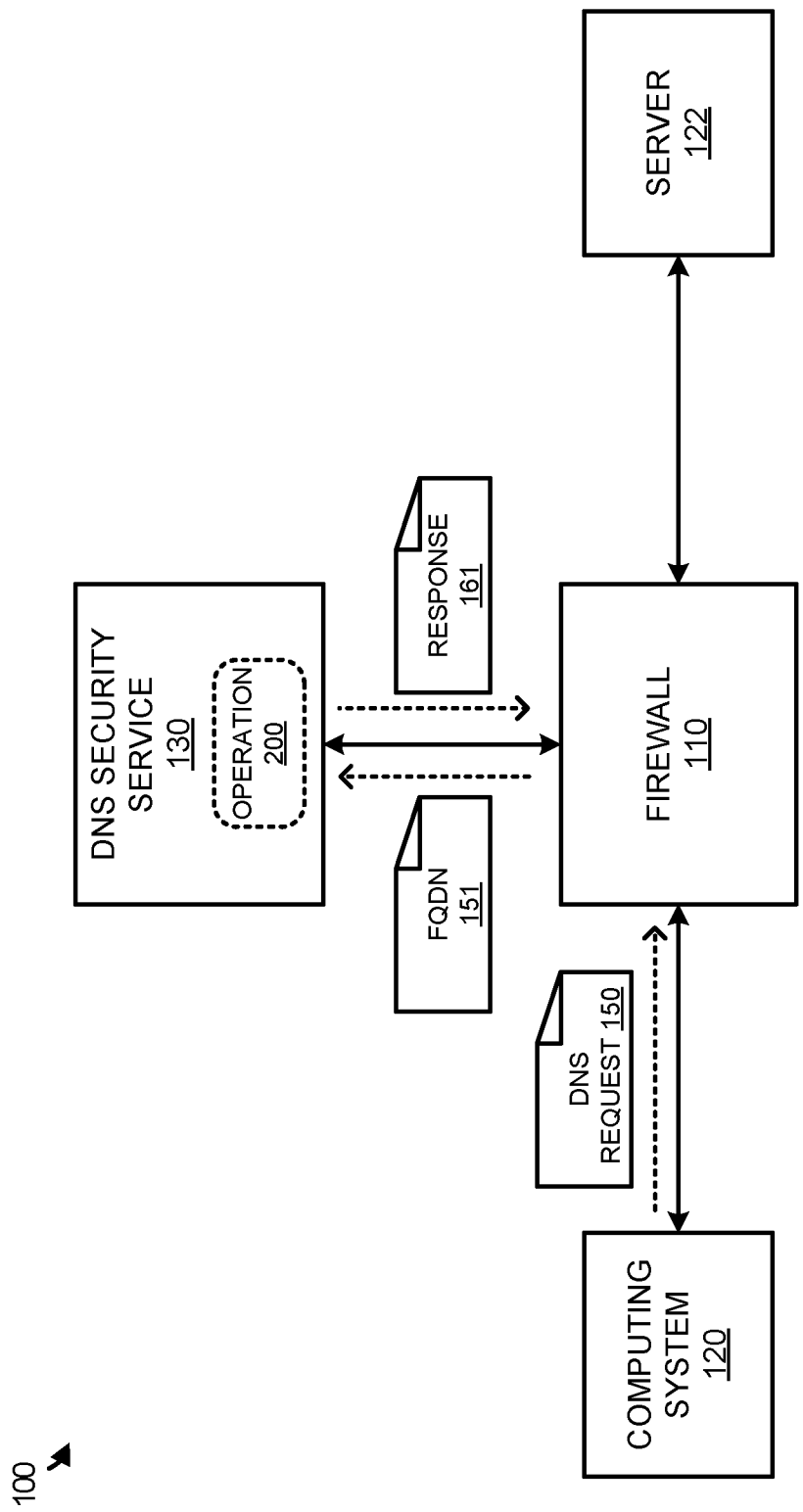
FIG. 1 illustrates a computing environment to manage permissions associated with fully qualified domain names (FQDNs) according to an implementation.

In many computing environments, firewalls are deployed that are used to monitor ingress and egress packets for one or more computing systems and determine whether to block, permit, redirect, or provide some other operation with respect to the packet. These determinations may be based on rules that can act on packets based on addressing in the packet, protocols for the packet, or some other factor. Here, a firewall may identify domain name system (DNS) requests from a computing system or device in the network that includes a fully qualified domain name (FQDN). A FQDN specifies the exact location in the tree hierarchy of the DNS. It specifies all domain levels, including the top-level domain and the root zone. In some examples, the FQDN can have a host name and at least one higher-level domain (label) and always ends in the top-level domain. Once the FQDN is identified, the FQDN may be provided to a DNS security service that analyzes infrastructure associated with the FQDN to determine a traffic rule for FQDN. The traffic rule may be used to permit, block, redirect, or provide some other action in association with the destination server for the FQDN.

To analyze the infrastructure associated with the FQDN, the DNS security service may analyze trust factors associated with the reputation of the DNS response for the FQDN. These trust factors may be associated with the A or AAAA records for the FQDN, the authoritative name server associated with the FQDN, the number of requests with the FQDN, or some other factor. The information for the trust factors may be maintained locally but may also be obtained from other services or databases that can provide information on the status, reputation, location, or some other information associated with the trust factors. Advantageously, rather than identifying information associated with the destination server or destination IP address, the DNS security service may process information about the reputation of the DNS response, including the services, certificates, records, and systems providing the response, to determine if the requested destination is potentially malicious. In some examples, the factors may be used to generate a trust score for the FQDN. Each of the factors may contribute to the trust score uniformly or may contribute differently to the trust score. For example, a risk assessment for a Name Server may contribute differently to the trust score than the number of requests for the FQDN.

Once the score is determined, a traffic rule may be identified from a set of traffic rules based on the score satisfying criteria for that rule. The traffic rule may then be provided to the firewall to implement the action corresponding to the rule. In implementing the traffic rule, the firewall may prevent a DNS response from being provided for the DNS request, may permit the DNS response to be provided to the requesting computing system, may block traffic associated with the IP address retrieved using the DNS request, may redirect traffic to another IP address, or may perform some other action.

FIG. 1 illustrates a computing environment 100 to manage permissions associated with FQDN according to an implementation. Computing environment 100 includes computing system 120, firewall 110, domain name system (DNS) security service 130, and server 122. Computing environment 100 includes DNS request 150, fully qualified domain name (FQDN) 151, and response 161. DNS security service 130 is configured to provide at least operation 200 that is described below with respect to FIG. 2.

In operation, firewall 110 may be used to provide security associated with computing systems or devices that attempt to connect over the network. The firewall monitors ingress and egress packets for the computing system and determines whether to allow, block, redirect, or provide some other operation in association with a packet or communication. Here, computing system 120 generates a DNS request 150 that includes a FQDN. A FQDN specifies the exact location in the tree hierarchy of the DNS. It specifies all domain levels, including the top-level domain and the root zone. In some examples, the FQDN can have a host name and at least one higher-level domain (label) and always ends in the top-level domain.

When the request is received by firewall 110, firewall 110 may provide or communicate the FQDN to DNS security service 130. DNS security service 130 is used to determine whether the FQDN requested from computing system 120 should be trusted or that the destination is likely malicious. To make this determination, DNS security service may calculate a trust score that can be used to select a traffic rule or action for the request, wherein the action may include permitting the DNS request and the communication, blocking the request and the communication, redirecting the request or communication, or providing some other action in association with the request. In generating the score, the DNS security service 130 may consider a variety of trust factors associated with the FQDN. The trust factors may include time delta information between requests for the FQDN, a volume of queries for the FQDN, infrastructure information associated with the A or AAAA records associated with the FQDN, a risk score of the authoritative Name Server, a quantity of record changes associated with the FQDN, SSL certificate comparison with other domains, a quantity of TXT records associated with the FQDN, or some other factor. The infrastructure information for the A or AAAA records may include information about the time to live associated with the FQDN, location of the record, or some other information associated with the record. The risk score of the authoritative Name Server may be determined based on reputation information provided from one or more sources and may be determined based on length of operation, owner, or some other information.

In some implementations, each of the factors may contribute to the score, wherein the score may comprise a numerical value, a letter grade, or some other scoring mechanism. For example, for a first quantity of requests for the FQDN, DNS security service 130 may allocate a first score, while for a second quantity of requests for the FQDN, DNS security service 130 may allocate a second score. The scores may then be aggregated for the various factors to determine a current score for the FQDN. Once the score is calculated in association with the FQDN, DNS security service 130 may determine traffic rules for the DNS request based on the score. In some implementations, different traffic rules may be deployed based on whether the score satisfies criteria or a threshold. For example, if a score satisfies a first score threshold, DNS security service 130 may permit the connection using the address associated with the FQDN. However, if the score satisfies a second score threshold, DNS security service 130 may block the connection with an associated IP address.

Figure 2:
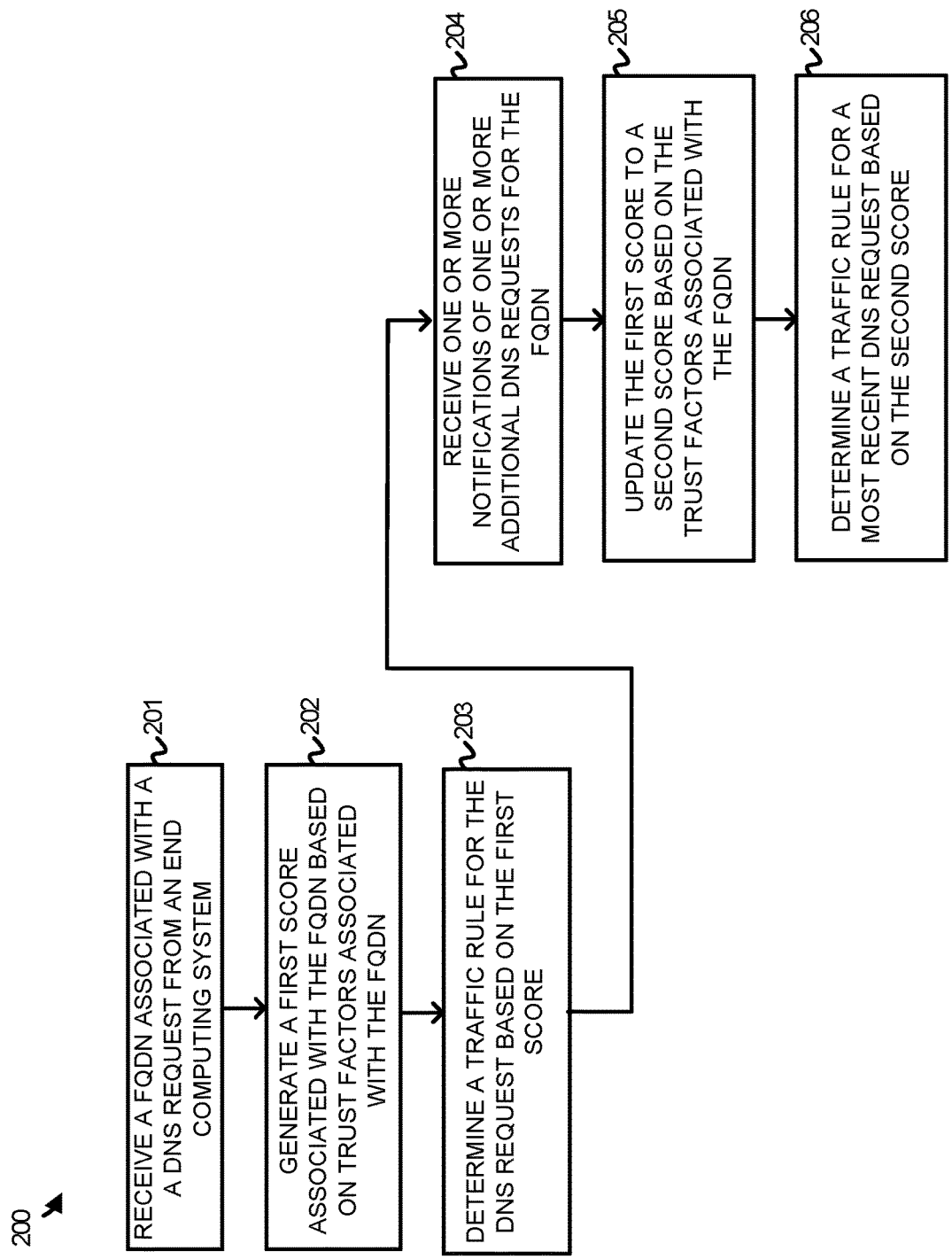
FIG. 2 illustrates an operation of a domain name system (DNS) security service to manage permissions associated with FQDNs according to an implementation.

FIG. 2 illustrates an operation 200 of a domain name system (DNS) security service to manage permissions associated with FQDNs according to an implementation. The steps of operation 200 are referenced parenthetically in the paragraphs that follow with reference to systems and elements of computing environment 100 of FIG. 1.

As depicted, operation 200 includes obtaining (201) a FQDN associated with a DNS request by a computing system. The DNS request may comprise a request from a physical computing device, such as a desktop computer, laptop computer, and the like, or may comprise a request from a virtual computing device, such as a virtual machine or container. When an FQDN is identified as part of the request by a firewall 110, the FQDN may be forwarded to DNS security service 130. Although demonstrated as separate in the example of FIG. 1, the operations of DNS security service 130 may be implemented wholly or partially at the computing system providing the firewall.

In response to obtaining the FQDN, operation 200 further generates (202) a first score for the FQDN based on trust factors associated with the FQDN. The trust factors may include, but are not limited to, time delta information between requests for the FQDN, a volume of queries for the FQDN, infrastructure information associated with the A or AAAA records associated with the FQDN, a risk score of the authoritative Name Server, a quantity of record changes associated with the FQDN, SSL certificate comparison with other domains, a quantity of TXT records associated with the FQDN, or some other factor. For each of the factors, a score may be determined that can contribute to the overall score associated with the FQDN. For example, a first authoritative Name Server may be allocated a first score based on its reputation (e.g., length of operation, owner, etc.), while a second authoritative Name Server may be allocated a second score based on its reputation. The score for the individual factor may be combined with scores associated with one or more other factors to determine the overall score associated with the FQDN. In some implementations, scores for some factors may weigh more heavily than scores associated with other factors. For example, the risk score associated with the authoritative Name Server may contribute more to the overall score for the FQDN than the score associated with the volume of queries for the FQDN.

Once the score is determined for the FQDN, DNS security service 130 may determine (203) a traffic rule from a plurality of traffic rules for the DNS request based on the first score. The traffic rule may permit the connection to the address associated with the FQDN, block the connection to the address associated with the FQDN, redirect the connection to another destination, or provide some other action in association with the FQDN. Once determined, DNS security service 130 may provide the traffic rule to the firewall to apply the rule. In some examples, the firewall may return the requested address, block the return of the DNS to the requesting computing device, may provide a redirect IP address to the requesting computing device, or may implement some other action to manage the connection for the computing device.

After generating the first score, operation 200 further obtains (204) one or more notifications of one or more additional DNS requests for the FQDN. In response to the one or more notifications, operation 200 updates (205) the first score to a second score based on the trust factors associated with the FQDN. In some implementations, the trust score is updated after each of the DNS requests with the FQDN, wherein the score may increase or decrease based on changes in association with the various factors.

Once the second score is determined, operation 200 determines (206) a second traffic rule from the plurality of traffic rules for a most recent DNS request of the one or more additional DNS requests. The score may be updated based on the changes associated with the various factors. For example, a FQDN may initially use a first authoritative Name Server that is associated with a first score, while, during a second DNS request, the FQDN may use a second authoritative Name server that is associated with a second score. The changes in the score for the Name Server may be used to update the overall score that is used to determine the traffic rule for the FQDN. In some implementations, each of the trust factors may be updated for each DNS request with the FQDN. In other implementations, a portion of the trust factors may be updated or checked for each DNS request with the FQDN. As an example, the authoritative Name Server may only be checked once for every five DNS requests with the FQDN, while the statistics for the number of requests with the FQDN may be updated for each of the requests.

In some examples, as the score is updated based on for the FQDN, DNS security service 130 may determine when the traffic rule changes for the FQDN. DNS security service 130 may indicate the current traffic rule after each DNS request, may update firewall 110 on the traffic rule only when the traffic rule changes, or may provide information about the traffic rule on some other interval.

In some implementations, in determining the traffic rule, DNS security service 130 may determine when the score satisfies one or more criteria, or a threshold associated with a traffic rule. For example, a first score or a low trust score may qualify for a traffic rule to block communications associated with the FQDN, while a second score or high trust score may qualify for a traffic rule to permit connections associated with the FQDN.

In some examples, the score associated with the FQDN may expire or time out, resulting in the score being reset. The expiration of the FQDN may occur in response to a period expiring after the first DNS request with the FQDN, may occur in response to a period expiring after the most recent DNS request with the FQDN, or may occur at some other interval. For example, if a period expires following the most recent DNS request with the FQDN, DNS security service 130 may reset the score associated with the FQDN. When a new request is obtained, FQDN may calculate a new score using new information, which may include resetting counters, request statistics, or some other information associated with the FQDN.

Figure 3A:
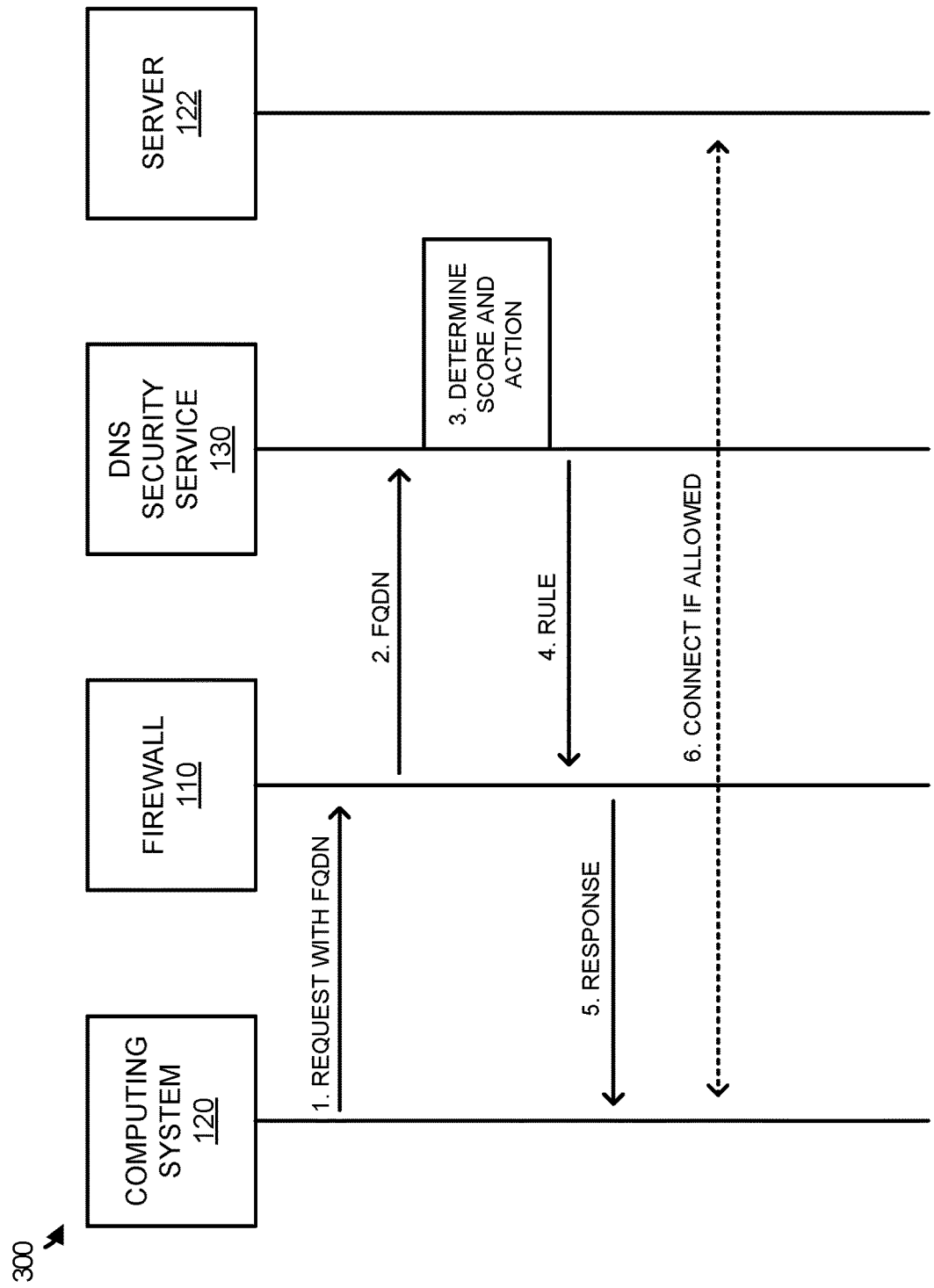
FIG. 3A-3B illustrate a timing diagram of managing permissions associated a FQDN according to an implementation.
Figure 3B:
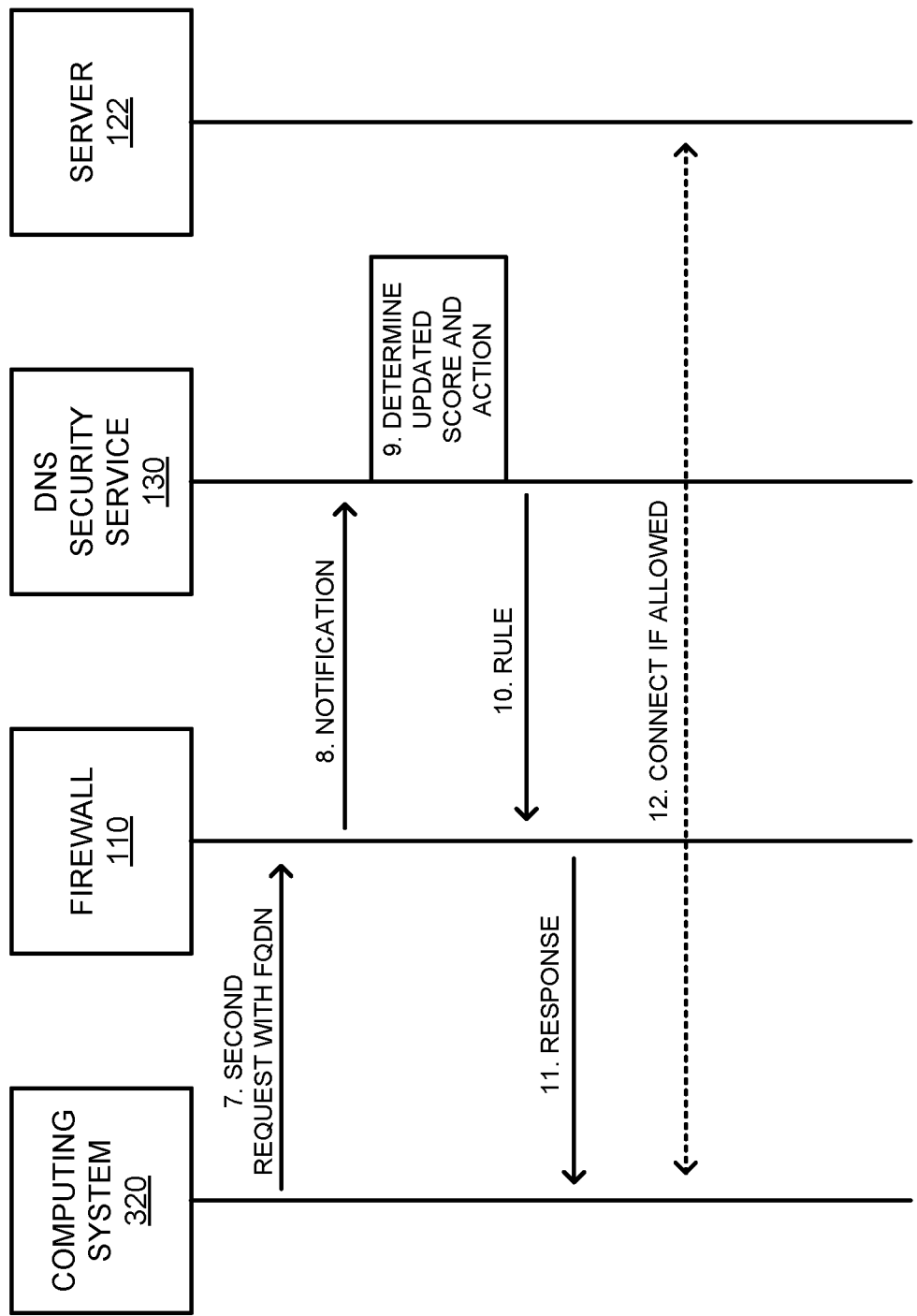

FIGS. 3A-3B illustrate a timing diagram of managing permissions associated a FQDN according to an implementation. The timing diagram in FIGS. 3A and 3B include computing system 120, firewall 110, DNS security service 130, and server 122 from computing environment 100 of FIG. 1. FIG. 3B includes computing system 320, which is representative of a computing system that uses firewall 110 for managing connection limitations.

Referring first to FIG. 3A, computing system 120, generates a DNS request with a FQDN, at step 1, that is received by firewall 110. In response to the request, firewall 110 may provide, at step 2, the FQDN to DNS security service 130 for a trust analysis of the FQDN. DNS security service 130 then determines, at step 3, a score, and action (traffic rule) for the FQDN based on trust factors associated with the DNS target of the FQDN. The trust factors are associated with the service or infrastructure that is providing the DNS lookup associated with the FQDN. The trust factors may include time delta information between requests for the FQDN, a volume of queries for the FQDN, infrastructure information associated with the A or AAAA records associated with the FQDN, a risk score of the authoritative Name Server, a quantity of record changes associated with the FQDN, SSL certificate comparison with other domains, a quantity of TXT records associated with the FQDN, or some other factor. Additional factors may include the number of requests for the FQDN from other networks not supported by firewall 110, databases indicating potentially malicious Name Servers, or some other source of information related to the trust of the FQDN. The factors may be used to identify risks in association with the publishing or records of the FQDN as part of DNS, which may indicate that the end IP address is malicious. In some examples, each of the factors may include a contributory score to the overall score for the FQDN. Each of the factors may be weighted evenly or may be weighted differently in contributing to the overall score. For example, a contributory score related to the authoritative name server may contribute more to the overall score than the quantity of requests for the FQDN.

Once the score is determined for the FQDN, an action or traffic rule for the request is identified and provided, at step 4, to firewall 110. The traffic rule may be identified based on the score satisfying one or more criteria associated with the traffic rule. The traffic rule may indicate to firewall 110 whether to block, permit, redirect, or perform some other action in association with the DNS request. In some implementations, if the DNS request is blocked in association with the FQDN, then firewall 110 may never provide an IP address to the requesting computing system. In other examples, where the request is permitted for the FQDN, firewall 110 may provide the IP address identified during a DNS lookup. In still further examples, if the request for the FQDN should be redirected, firewall 110 may provide a different IP address in place of the IP address for the FQDN. This alternative IP address may be used to indicate to the requesting computing system that the requested destination server could be malicious. Here, firewall 110 provides a response, at step 5, to computing system 120 for the DNS request and computing system 120 initiates, at step 6, a connection with server 122 if the connection is allowed.

In some implementations, rather than blocking the DNS response to computing system 120 based on a traffic rule, firewall 110 may provide the IP address for the DNS request, but block, terminate, or reset the connection with the server to prevent communications between computing system 120 and server 122. In some examples, firewall 110 may cache the most recent traffic rule identified for a FQDN and enforce the rule until an update is provided by DNS security service 130.

Turning to FIG. 3B, computing system 320 generate and communicate second DNS requests with the FQDN to firewall 110 at step 7. In turn, firewall 110 provides notifications to DNS security service 130 that the DNS requests were received with the FQDN at step 8. In response to receiving the notifications, DNS security service 130 may update the score associated with the FQDN and update the traffic rule or action associated with the FQDN at step 9. In some implementations, DNS security service 130 may update each of the factors for the FQDN for each DNS request from computing system(s) 320. In other implementations, a portion or subset of the factors may be updated for the FQDN for each request. For example, the factor related to the quantity of requests for the FQDN might be updated during each request, while the factor associated with the authoritative Name Server may be updated after five requests. Once the updates are identified for the individual factors, the overall score may be updated and used to identify a traffic rule for the FQDN. In some examples, the second traffic rule identified for the DNS request from computing system 320 may comprise a different traffic rule than the request Once the traffic rule is identified, the traffic rule is communicated, at step 10, to firewall 110 for enforcement. In the example of a rule that permits traffic associated with the FQDN, firewall 110 may provide a DNS response that includes the IP address associated with the FQDN and computing system 320 may initiate a connection with server 122, at step 12, when the connection is allowed.

In other examples, if the FQDN is identified to be potentially malicious, firewall 110 may not provide a response to the DNS request, may indicate an IP address associated with a redirect instead of the desired destination, or may provide some other response (or lack of response) based on the rule provided by DNS security service 130. In some implementations, firewall 110 may cache the rule for the FQDN and may apply the rule until an update is received from DNS security service 130. In some examples, firewall 110 may enforce rules on the IP addresses returned from the DNS request to block or allow communications based on the traffic rule provided from DNS security service 130. For example, after a FQDN is provided to DNS security service 130, DNS security service 130 may determine that the server is potentially malicious and provide an indication to firewall 110. As a result of the notification, firewall 110 may block, reset, or terminate connections associated with the IP address for the DNS lookup.

Figure 4:
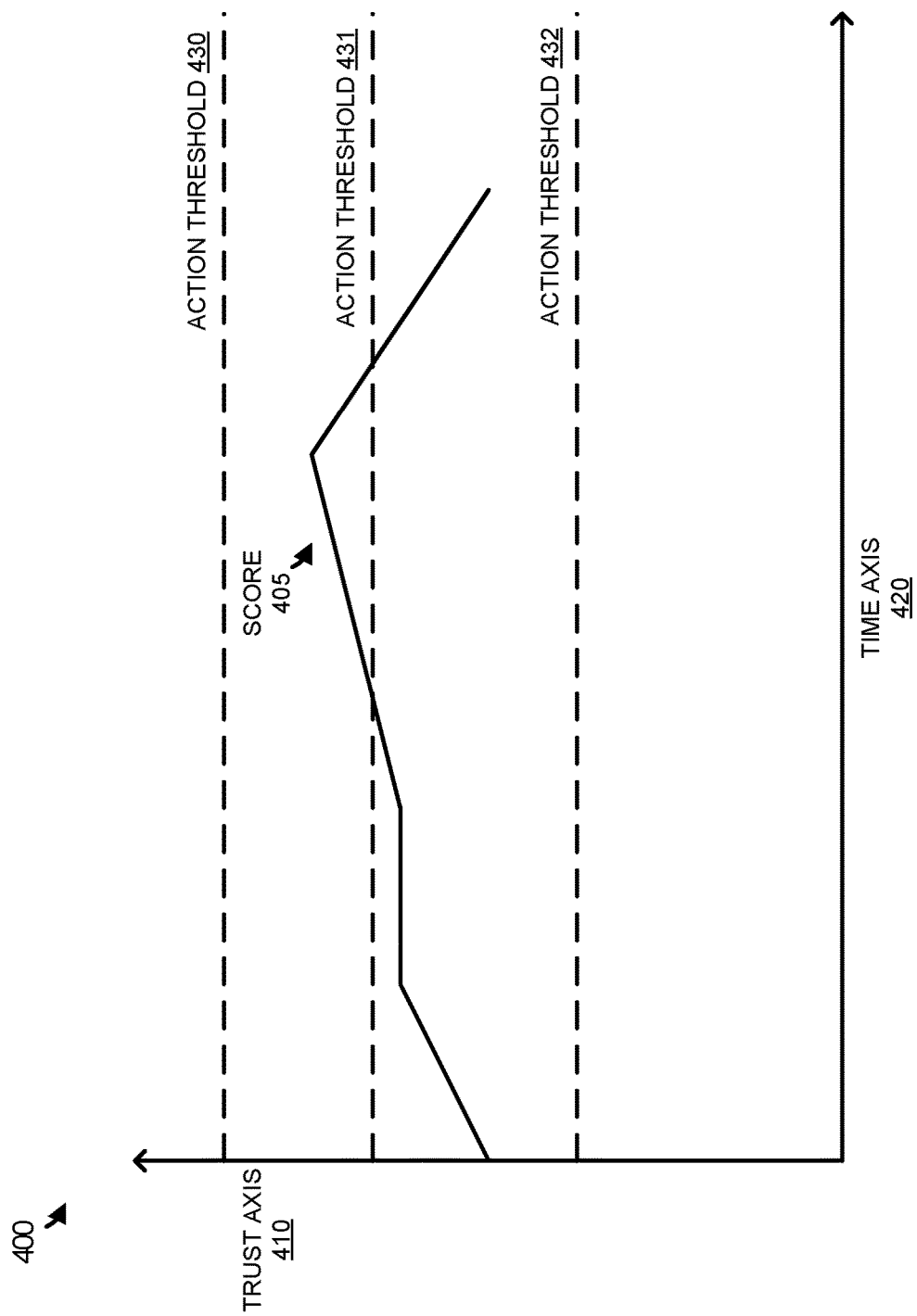
FIG. 4 illustrates a graph demonstrating the trust score for a FQDN according to an implementation.

FIG. 4 illustrates a graph 400 demonstrating the trust score for a FQDN according to an implementation. Graph 400 includes trust axis 410, time axis 420, action thresholds 430-432, and score 405.

As described herein, a DNS security service may be used to obtain FQDNs from at least one firewall and determine a trust score associated with the FQDN. The trust score is generated from factors associated with the DNS target and DNS resolution information associated with the FQDN. The factors may include time delta information between requests for the FQDN, a volume of queries for the FQDN, infrastructure information associated with the A or AAAA records associated with the FQDN, a risk score of the authoritative Name Server, a quantity of record changes associated with the FQDN, SSL certificate comparison with other domains, a quantity of TXT records associated with the FQDN, or some other factor. The factors may be used to estimate the trust of the destination server by using infrastructure information associated with how a DNS request with the FQDN is managed (Name Sever information, record information, etc.). In some implementations, each of the factors may contribute equally to the overall score for the FQDN, however, the factors may contribute unequally to the score for the FQDN.

After calculating a first score for the FQDN, the DNS monitoring system may update the score based on subsequent requests that include the FQDN. The updates may be based on the number of requests with the FQDN, the frequency of the requests with the FQDN, changes in the status of the records or Name Servers, or some other updates. In some implementations, each of the factors are updated after each request, but one or more of the factors may be updated periodically, after a quantity of requests, or at some other interval. When the factors are updated, the new score is calculated and used to determine the traffic rule for the FQDN.

Here, different traffic rules are triggered via action thresholds 430-432, wherein the thresholds comprise values associated with the trust score. For example, the score 405 may be calculated on a scale of 0-100, action threshold 432 may comprise a value of 50, action threshold 431 may comprise a value of 80, and action threshold 430 may comprise a value of 90. When the score satisfies a threshold, the traffic rule associated with that threshold may be triggered. The traffic rule may then be provided to the firewall to implement the corresponding action, which may include preventing a DNS response from being provided to the device, permitting a DNS response to be provided to the device, blocking or termination connections with the IP address retrieved for the FQDN, or some other action.

In some implementations, the DNS security system may set a timeout that is used to reset the score associated with the FQDN score. The timeout may occur when a request has not occurred for the FQDN within a period, when the FQDN score has been maintained for a period, or at some other interval. When a new request is received, the DNS security service may calculate a new score and update the score based on any subsequent requests.

Figure 5:
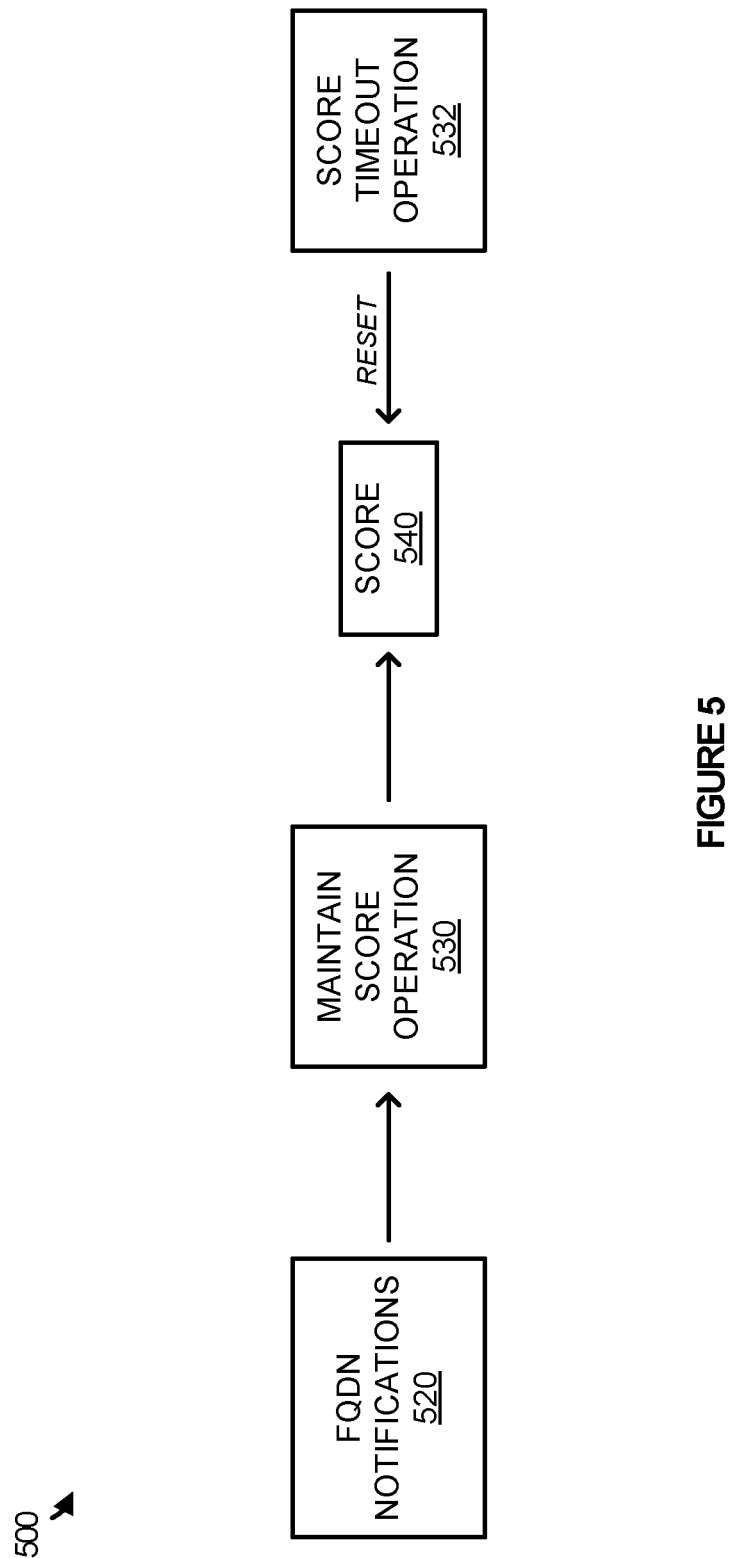
FIG. 5 illustrates an operational scenario of updating a trust score associated with a FQDN according to an implementation.

FIG. 5 illustrates an operational scenario 500 of updating a trust score associated with a FQDN according to an implementation. Operational scenario 500 includes FQDN notifications 520, score 540, maintain score operation 530, and score timeout operation 532.

In deployment, a DNS security service may obtain FQDNs included in DNS requests and determine trust scores associated with each of the FQDNs. The trust scores may be determined using trust factors related to the reputation of the DNS response, including the services and systems providing the DNS response. The trust factors may include information about the authoritative Name Server, the quantity of requests with a FQDN, changes or information about the A or AAAA records, or some other information.

Here, the maintain score operation 530 obtains FQDN notifications 520 for a FQDN from a firewall and maintains score 540 for the FQDN. Using the score, the DNS security service may identify traffic rules and provide the traffic rules to a firewall to manage the DNS response and connections from computing systems. In addition to maintaining the score using maintain score operation 530, the DNS security service may further use score timeout operation 532 to determine when a score should be reset. The timeout may occur when a period expires following the most recent notification with the FQDN, may occur when a period expires following the first notification with the FQDN, or may come after some other interval. Once the timeout occurs, the score may be deleted, and a new score may be generated with the FQDN is identified. Advantageously, if a long period existed between notifications with a FQDN, the factors may change so much that it is preferable that the previous score does not influence the next score.

Figure 6:
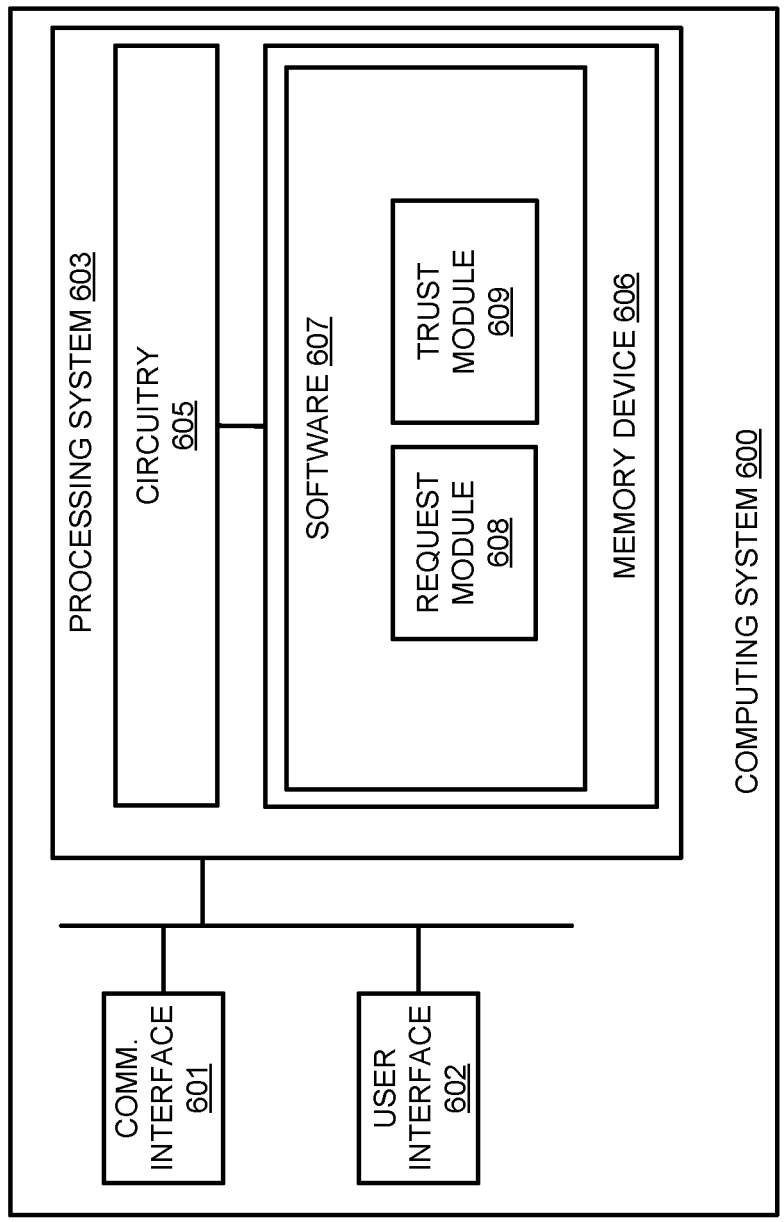
FIG. 6 illustrates a DNS security service computing system according to an implementation.

FIG. 6 illustrates a DNS security service computing system according to an implementation. Computing system 600 is representative of any computing system or systems with which the various operational architectures, processes, scenarios, and sequences disclosed herein for a firewall may be implemented. Computing system 600 is an example firewall 110, although other examples may exist. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In at least one implementation, communication interface 601 may communicate with a firewall implemented in a computing system or systems. Communication interface 601 may further be used to connect the one or more computing systems to computing elements, such as servers or clients, over the internet.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes request module 608 and trust module 609, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, request module 608 directs processing system 603 to obtain a FQDN associated with a domain name system DNS request by a computing device. In some implementations, when a firewall identifies a DNS request with a FQDN, the FQDN is forwarded to the computing system 600. Once the FQDN is received, trust module 609 directs processing system 603 to generate a first score for the FQDN based on trust factors associated with the FQDN. The trust factors may include, but are not limited to, time delta information between requests for the FQDN, a volume of queries for the FQDN, infrastructure information associated with the A or AAAA records associated with the FQDN, a risk score of the authoritative Name Server, a quantity of record changes associated with the FQDN, SSL certificate comparison with other domains, a quantity of TXT records associated with the FQDN, or some other factor. The trust factors correspond to the infrastructure that is used in responding to the DNS request, wherein the infrastructure may comprise services, servers, certificates, records, and the like associated with responding to the DNS request.

In some implementations, each of the factors may contribute equally to creating the overall score associated with the FQDN. In other implementations, factors may be weighted differently providing more emphasis on one factor over another. The score may comprise a numerical value (e.g., 0-100), may comprise a letter grade, or may comprise some other scoring mechanism. The information for the factors may be maintained locally, such as information risk status of different Name Servers, or may be stored at least partially on external services or databases that can provide information about the infrastructure associated with providing the DNS response. The information may then be processed to generate a score.

Once a score is identified for the FQDN, trust module 609 may direct processing system 603 to determine a traffic rule from a plurality of traffic rules for the DNS request based on the first score. The traffic rule may be based on the score satisfying criteria or a threshold associated with the traffic rule. The traffic rule may indicate that the request is permitted, blocked, should be redirected, or some other action in association with the DNS request. Once the rule is selected, the rule may be provided to the firewall to implement the rule.

Once an initial score is generated for the FQDN, request module 608 may direct processing system 603 to obtain one or more notifications of one or more additional DNS requests for the FQDN. In response to the one or more notification, trust module 609 directs processing system 603 to update the first score to a second score based on the trust factors associated with the FQDN. As the notifications are received, the trust module 603 may update the information associated with the factors. For example, trust module 603 may update counters associated with the number of DNS requests with the FQDN. Based on the updated factors, a second score can be generated that is an update of the first score. The second score can then be used by trust module 609 to select a traffic rule for the FQDN and provide the selected rule to the firewall for enforcement.

Although described as separate from the firewall, at least a portion of the operations of the DNS security service may be implemented in the firewall. In other examples, DNS security service 130 may be deployed in a cloud computing center or a server, wherein one or more firewalls may provide FQDNs to the DNS security service for processing and a determination of the traffic rules.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
obtaining a fully qualified domain name (FQDN) associated with a domain name system (DNS) request by a computing device;
in response to obtaining the FQDN, generating a first score for the FQDN based on trust factors associated with the FQDN, wherein generating the first score comprises determining factor scores for respective ones of the trust factors, combining the factor scores to create the first score, updating the first score upon receiving subsequent DNS requests for the FQDN, and resetting the first score when a timeout time is satisfied;
determining the first score satisfies a first action threshold of a plurality of action thresholds corresponding to different rules of a plurality of traffic rules for a firewall;
determining the first action threshold corresponds to a traffic rule of the plurality of traffic rules; and
implementing the traffic rule for the FQDN in the firewall.

2. The method of claim 1 further comprising:
obtaining one or more notifications of one or more additional DNS requests for the FQDN;
updating the first score to a second score based on the trust factors associated with the FQDN; and
determining a second traffic rule from the plurality of traffic rules for a most recent DNS request of the one or more additional DNS requests based on the second score.

3. The method of claim 1, wherein the trust factors comprise at least a time delta between requests for the FQDN and a volume of queries for a period.

4. The method of claim 1, wherein the trust factors comprise popularity information for the FQDN globally.

5. The method of claim 1, wherein the trust factors comprise scores associated with infrastructure to which A or AAAA records for the FQDN point, a risk score of an authoritative Name Server for the FQDN, or a quantity of record changes for the FQDN.

6. The method of claim 1, wherein the plurality of traffic rules comprises a rule to allow traffic, a rule to redirect traffic, and a rule to block traffic.

7. The method of claim 1 further comprising communicating the traffic rule to a firewall associated with the computing device.

8. The method of claim 1 further comprising:
obtaining information associated with one or more of the trust factors from an external database.

9. A computing apparatus comprising:
a storage system;
a processing system operatively coupled to the storage system; and
program instructions stored on the storage system that, when executed by the processing system, direct the computing apparatus to:
obtain a fully qualified domain name (FQDN) associated with a domain name system (DNS) request by a computing device;
in response to obtaining the FQDN, generate a first score for the FQDN based on trust factors associated with the FQDN, wherein generation of the first score comprises determining factor scores for respective ones of the trust factors, combining the factor scores to create the first score, updating the first score upon receiving subsequent DNS requests for the FQDN, and resetting the first score when a timeout time is satisfied;
determine the first score satisfies a first action threshold of a plurality of action thresholds corresponding to different rules of a plurality of traffic rules for a firewall;
determine the first action threshold corresponds to a traffic rule of the plurality of traffic rules; and
implement the traffic rule for the FQDN in the firewall.

10. The computing apparatus of claim 9, wherein the program instructions further direct the computing apparatus to:
obtain one or more notifications of one or more additional DNS requests for the FQDN;
update the first score to a second score based on the trust factors associated with the FQDN; and
determine a second traffic rule from the plurality of traffic rules for a most recent DNS request of the one or more additional DNS requests based on the second score.

11. The computing apparatus of claim 9, wherein the trust factors comprise at least a time delta between requests for the FQDN and a volume of queries for a period.

12. The computing apparatus of claim 9, wherein the trust factors comprise popularity information for the FQDN globally.

13. The computing apparatus of claim 9, wherein the trust factors comprise scores associated with infrastructure to which A or AAAA records for the FQDN point, a risk score of an authoritative Name Server for the FQDN, or a quantity of record changes for the FQDN.

14. The computing apparatus of claim 9, wherein the plurality of traffic rules comprises a rule to allow traffic, a rule to redirect traffic, and a rule to block traffic.

15. The computing apparatus of claim 9, wherein the program instructions further direct the computing apparatus to communicate the traffic rule to a firewall associated with the computing device.

16. The computing apparatus of claim 9, wherein the program instructions further direct the computing apparatus to obtain information associated with one or more trust factors from an external database.

17. A system comprising:
a firewall computing system configured to:
receive a fully qualified domain name (FQDN) as part of a domain name system (DNS) request by a computing device; and
communicate the FQDN to a DNS security service computing system; and
the DNS security service computing system configured to:
receive the FQDN;
in response to receiving the FQDN, generate a first score for the FQDN based on trust factors associated with the FQDN, wherein generation of the first score comprises determining factor scores for respective ones of the trust factors, combining the factor scores to create the first score, updating the first score upon receiving subsequent DNS requests for the FQDN, and resetting the first score when a timeout time is satisfied;

determine the first score satisfies a first action threshold of a plurality of action thresholds corresponding to different rules of a plurality of traffic rules for a firewall;

determine the first action threshold corresponds to a traffic rule of the plurality of traffic rules; and implement the traffic rule for the FQDN in the firewall.

18. The system of claim 17, wherein the DNS security service computing system is further configured to:

receive one or more notifications of one or more additional DNS requests for the FQDN;

update the first score to a second score based on the trust factors associated with the FQDN; and determine a second traffic rule from the plurality of traffic rules for a most recent DNS request of the one or more additional DNS requests based on the second score.

* * * * *